(12) United States Patent
Wada (10) Patent No.: US 10,950,039 B2
(45) Date of Patent: Mar. 16, 2021

(54) IMAGE PROCESSING APPARATUS

(71) Applicant: Sony Interactive Entertainment Inc., Tokyo (JP)

(72) Inventor: Shinya Wada, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/305,970

(22) PCT Filed: Jun. 7, 2017

(86) PCT No.: PCT/JP2017/021115
§ 371 (c)(1),
(2) Date: Nov. 30, 2018

(87) PCT Pub. No.: WO2017/217296
PCT Pub. Date: Dec. 21, 2017

(65) Prior Publication Data
US 2019/0156563 A1    May 23, 2019

(30) Foreign Application Priority Data

Jun. 16, 2016 (JP) .............................. JP2016-119896

(51) Int. Cl.
*G06T 19/00* (2011.01)
*G06T 19/20* (2011.01)
*G06T 15/80* (2011.01)
*G06T 1/00* (2006.01)
*G06T 7/70* (2017.01)
*H04N 13/271* (2018.01)
*H04N 13/00* (2018.01)

(52) U.S. Cl.
CPC ............... *G06T 15/80* (2013.01); *G06T 1/00* (2013.01); *G06T 7/70* (2017.01); *G06T 19/006* (2013.01);
(Continued)

(58) Field of Classification Search
CPC .. G06T 15/80; G06T 1/00; G06T 7/70; G06T 19/006; G06T 19/20; G06T 2215/16;
(Continued)

(56) References Cited

U.S. PATENT DOCUMENTS 8,405,680 B1 * 3/2013 Cardoso Lopes ....... G06T 19/00
345/426
9,639,991 B2    5/2017 Kuranoshita
(Continued)

FOREIGN PATENT DOCUMENTS

| JP | 2010170316 A | 8/2010 |
| JP | 2013127774 A | 6/2013 |
| JP | 2015176450 A | 10/2015 |

OTHER PUBLICATIONS

International Preliminary Report on Patentability and Written Opinion for corresponding PCT Application No. PCT/JP2017/021115, 11 pages, dated Dec. 27, 2018.
(Continued)

*Primary Examiner* — Diane M Wills
(74) *Attorney, Agent, or Firm* — Matthew B. Dernier, Esq.

(57) ABSTRACT

Provided is an image processing apparatus that: acquires a depth map that includes information that indicates a distance up to a subject in an actual space, the depth map including, for each of one or a plurality of areas in the depth map, information regarding the distance up to a subject portion that appears in the area and regarding a color component of the subject portion; and generates a composite image in which a virtual object is arranged in a scene image that represents a scene of the actual space. The image processing apparatus determines a display color of the virtual object on the basis of the distance up to the subject portion that appears in the depth map and the color component thereof.

13 Claims, 7 Drawing Sheets

(52) U.S. Cl.
CPC .......... G06T 19/20 (2013.01); H04N 13/271 (2018.05); *G06T 2207/10012* (2013.01); *G06T 2207/10028* (2013.01); *G06T 2215/16* (2013.01); *G06T 2219/2012* (2013.01); *H04N 2013/0077* (2013.01)

(58) Field of Classification Search
CPC . G06T 2207/10012; G06T 2207/10028; G06T 2219/2012; H04N 13/271; H04N 2013/0077
See application file for complete search history.

(56) References Cited

U.S. PATENT DOCUMENTS

| | | | |
|---|---|---|---|
| 2006/0279570 A1* | 12/2006 | Zhou | G06T 15/60 345/426 |
| 2012/0194516 A1 | 8/2012 | Newcombe | |
| 2012/0320039 A1* | 12/2012 | Ha | G06T 19/006 345/419 |
| 2013/0120451 A1 | 5/2013 | Sasaki | |
| 2013/0271625 A1* | 10/2013 | Gruber | H04N 5/23212 348/239 |
| 2014/0226041 A1 | 8/2014 | Eguchi | |
| 2015/0262427 A1 | 9/2015 | Kuranoshita | |
| 2017/0289515 A1* | 10/2017 | Li | H04N 5/2354 |
| 2019/0180517 A1* | 6/2019 | Yamazaki | G09G 3/002 |

OTHER PUBLICATIONS

International Search Report for corresponding PCT Application No. PCT/JP2017/021115, 4 pages, dated Jul. 25, 2017.
Extended European Search Report for corresponding EP Application No. 17813194.2, 9 pages, dated Nov. 11, 2019.

* cited by examiner

IMAGE PROCESSING APPARATUS

TECHNICAL FIELD

The present invention relates to an image processing apparatus, image processing method, program, and information storage medium for generating an image in which a virtual object is combined with a photographic image of a camera.

BACKGROUND ART

There is known a technique in which a virtual object is combined with a photographic image obtained by a camera. By using the above technique, it is possible to propose, to a user, an image as if the virtual object that does not really exist exists in a real space.

SUMMARY

Technical Problem

When the virtual object is assumed to really exist in the real space, a color of the virtual object ought to be changed or shading ought to be generated by lighting of surrounding ambient light or the like. However, it is difficult to represent an effect caused by the lighting as described above by using the above-described existing technique.

The present invention has been made in view of the above circumstances. An object of the invention is therefore to provide an image processing apparatus, image processing method, program, and information storage medium that are capable of providing a lighting effect with reality when combining the virtual object with a scene image that represents a scene of the real space.

Solution to Problem

An image processing apparatus according to the present invention includes a depth map acquisition section configured to acquire a depth map that includes information that indicates a distance up to a subject in an actual space, the depth map including, for each of one or a plurality of areas in the depth map, information regarding the distance up to a subject portion that appears in the area and regarding a color component of the subject portion; and a composite image generation section configured to generate a composite image in which a virtual object is arranged in a scene image that represents a scene of the actual space, in which the composite image generation section determines a display color of the virtual object on a basis of the distance up to the subject portion that appears in the depth map and the color component thereof.

Further, another image processing apparatus according to the present invention includes a depth map acquisition section configured to acquire a depth map that includes information that indicates a distance up to a subject in an actual space, the depth map including, for each of one or a plurality of areas in the depth map, information regarding the distance up to a subject portion that appears in the area; and a composite image generation section configured to generate a composite image in which a virtual object is arranged in a scene image that represents a scene of the actual space, in which the composite image generation section calculates a variation of a color of the subject portion caused by light from the virtual object on a basis of a position in the real space of the subject portion and a display color of the virtual object and changes a color of a pixel in the scene image corresponding to the subject portion in accordance with the calculated variation.

An image processing method according to the present invention includes a depth map acquisition step of acquiring a depth map that includes information that indicates a distance up to a subject, the depth map including, for each of one or a plurality of areas in the depth map, information regarding the distance up to a subject portion that appears in the area and regarding a color component of the subject portion; and a composite image generation step of generating a composite image in which a virtual object is arranged in a scene image that represents a scene of an actual space, in which in the composite image generation step, a display color of the virtual object is determined on a basis of the distance up to the subject portion that appears in the depth map and the color component thereof.

A program according to the present invention causes a computer to function as: a depth map acquisition section configured to acquire a depth map that includes information that indicates a distance up to a subject in an actual space, the depth map including, for each of one or a plurality of areas in the depth map, information regarding the distance up to a subject portion that appears in the area and regarding a color component of the subject portion; and a composite image generation section configured to generate a composite image in which a virtual object is arranged in a scene image that represents a scene of the actual space, in which the composite image generation section determines a display color of the virtual object on a basis of the distance up to the subject portion that appears in the depth map and the color component thereof. The program may be stored in a computer readable non-transitory information storage medium for provision.

DESCRIPTION OF EMBODIMENT

Hereinafter, an embodiment of the present invention will be described in detail with reference to the drawings.

Figure 1:
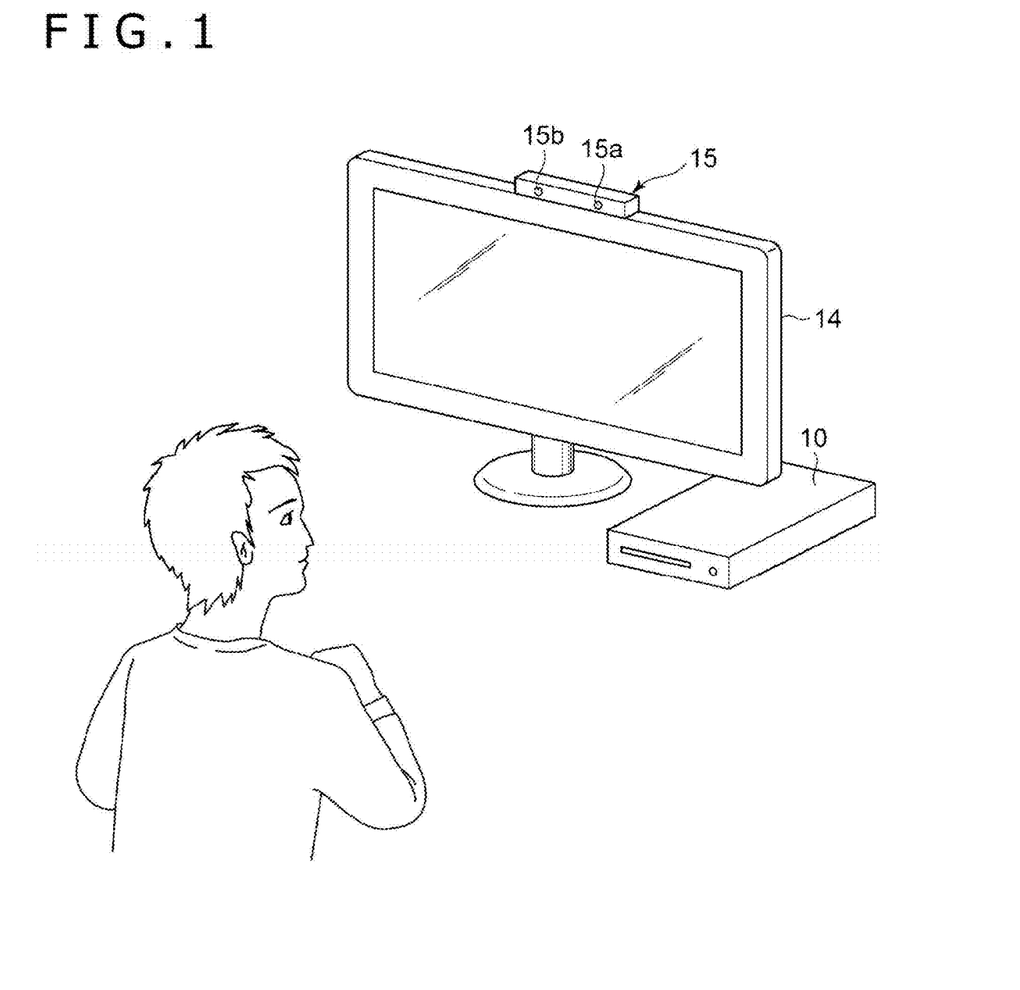
FIG. 1 is a diagram illustrating a state of using an image processing apparatus according to an embodiment of the present invention.
Figure 2:
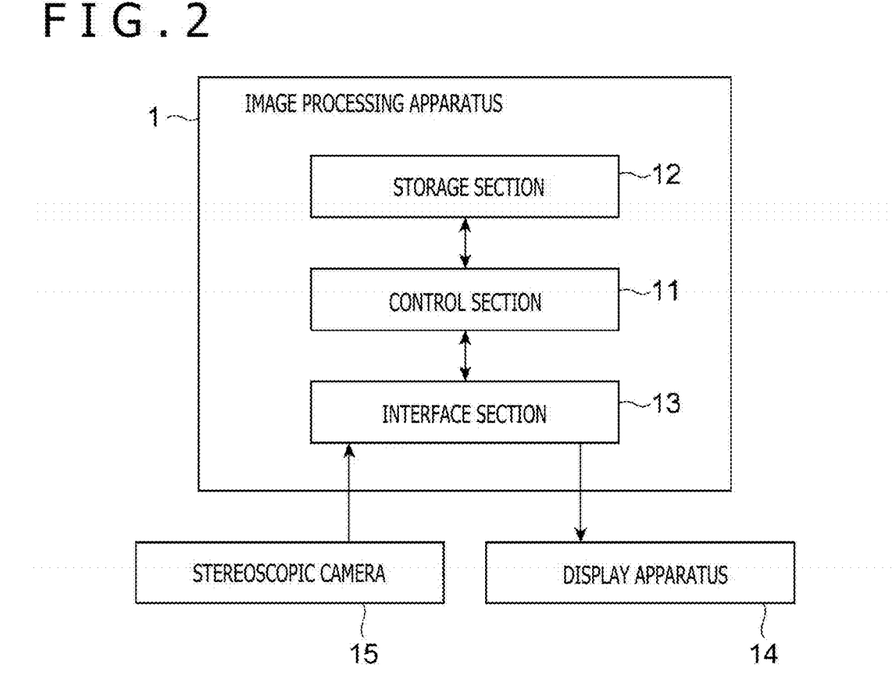
FIG. 2 is a configuration block diagram illustrating a configuration of the image processing apparatus according to the embodiment of the present invention.

FIG. 1 is a diagram illustrating a state of using an image processing apparatus 1 according to an embodiment of the present invention. Further, FIG. 2 is a configuration block diagram illustrating a configuration of the image processing apparatus 1. The image processing apparatus 1 is, for example, a home game device, a portable video game player, a personal computer, a smartphone, or the like. As illustrated in FIG. 2, the image processing apparatus 1 includes a control section 11, a storage section 12, and an interface section 13. As illustrated in FIG. 2, the image processing apparatus 1 is further connected to a display apparatus 14 and a stereoscopic camera 15.

The control section 11 includes at least one processor and executes a program stored in the storage section 12 to perform various information processings. In the present embodiment, a specific example of the processing performed by the control section 11 will be described below. The storage section 12 includes at least one memory device such as a RAM (Random Access Memory) and stores a program executed by the control section 11 and data processed by using the program. The interface section 13 is an interface in which the image processing apparatus 1 transmits and receives various pieces of information with the display apparatus 14 and the stereoscopic camera 15.

The display apparatus 14 is a head-mounted display, a home television receiver, a liquid crystal display, or the like and displays an image on a screen in accordance with a video signal output by the image processing apparatus 1.

The stereoscopic camera 15 includes a plurality of cameras that are arranged side by side. In the present embodiment, specifically, the stereoscopic camera 15 is assumed to include two cameras, that is, a camera 15a and a camera 15b. A parallax of the cameras is used to thereby calculate a distance up to a subject that appears in a photographing range of both two cameras. A photographic image photographed by each camera is input to the image processing apparatus 1 via the interface section 13.

Note that either of the display apparatus 14 and the stereoscopic camera 15 may be housed in a chassis of the image processing apparatus 1 or may be a discrete apparatus connected to the image processing apparatus 1 by wire or radio. Further, the stereoscopic camera 15 may be fixed on the display apparatus 14 or may be housed in a chassis of the display apparatus 14.

Figure 3:
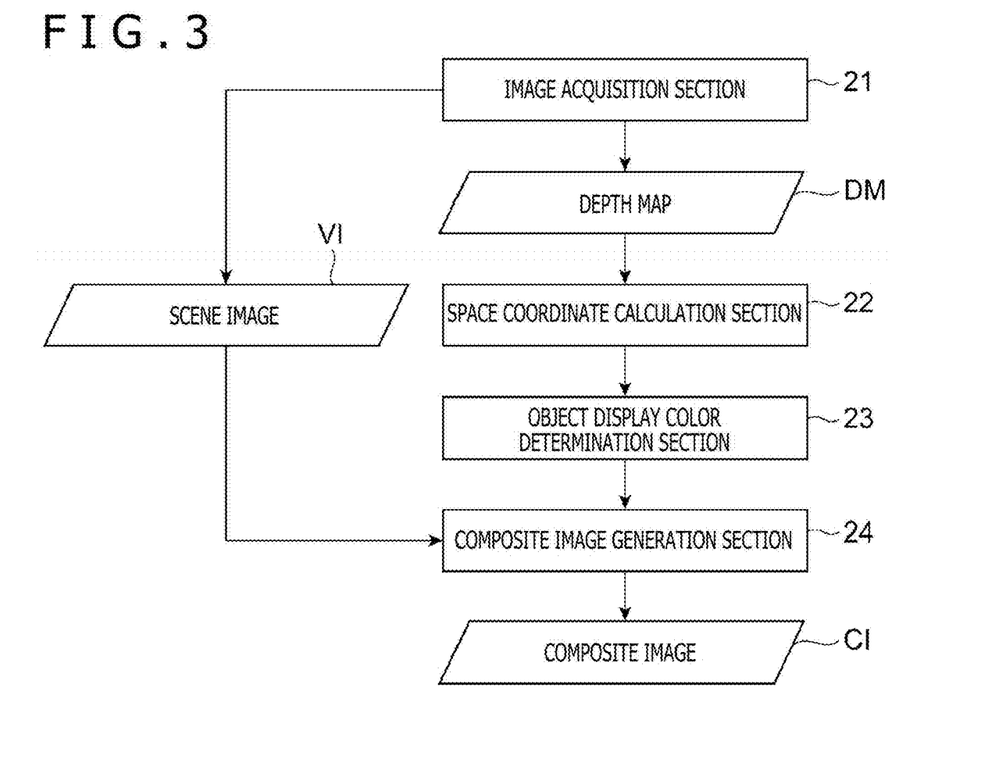
FIG. 3 is a functional block diagram illustrating functions of the image processing apparatus according to the embodiment of the present invention.

Hereinafter, functions implemented by the image processing apparatus 1 will be described with reference to FIG. 3. As illustrated in FIG. 3, the image processing apparatus 1 functionally includes an image acquisition section 21, a space coordinate calculation section 22, an object display color determination section 23, and a composite image generation section 24. The control section 11 operates in accordance with the programs stored in the storage section 12 and thereby the functions are implemented. The program may be provided for the image processing apparatus 1 through a communication network such as the Internet or may be stored in a computer readable information storage medium such as an optical disk for provision. The image processing apparatus 1 according to the present embodiment generates a composite image CI in which a virtual object O is arranged in a scene image VI that represents a scene of a real space. The generated composite image CI is displayed on the display apparatus 14.

The image acquisition section 21 acquires a depth map DM obtained by photographing the real space by the stereoscopic camera 15. The depth map DM according to the present embodiment is an image that includes information regarding a distance D and a color component C for each of a plurality of unit areas in an image. Here, the unit area may be every single pixel in the image or may be a pixel block that includes a plurality of pixels adjacent to each other. The distance D is a distance up to a portion (hereinafter, referred to as a detection point P) of the subject that appears in the corresponding unit area. The image acquisition section 21 calculates the distance D up to the detection point P on the basis of deviation of the position due to a parallax of the same detection point P between the photographic image by the camera 15a and the photographic image by the camera 15b. The color component C is information representing a color of the corresponding unit area and includes one or a plurality of values. For example, the color component C may be a value indicating respective luminance of key colors of R (red), G (green), and B (blue). The image acquisition section 21 acquires, as the color component C, a pixel value of the unit area in the photographic image by either of the camera 15a and the camera 15b. Note that when the photographic images by the camera 15a and the camera 15b are black and white images, the color component C may be a kind of value indicating the luminance and lightness of the unit area.

Figure 4:
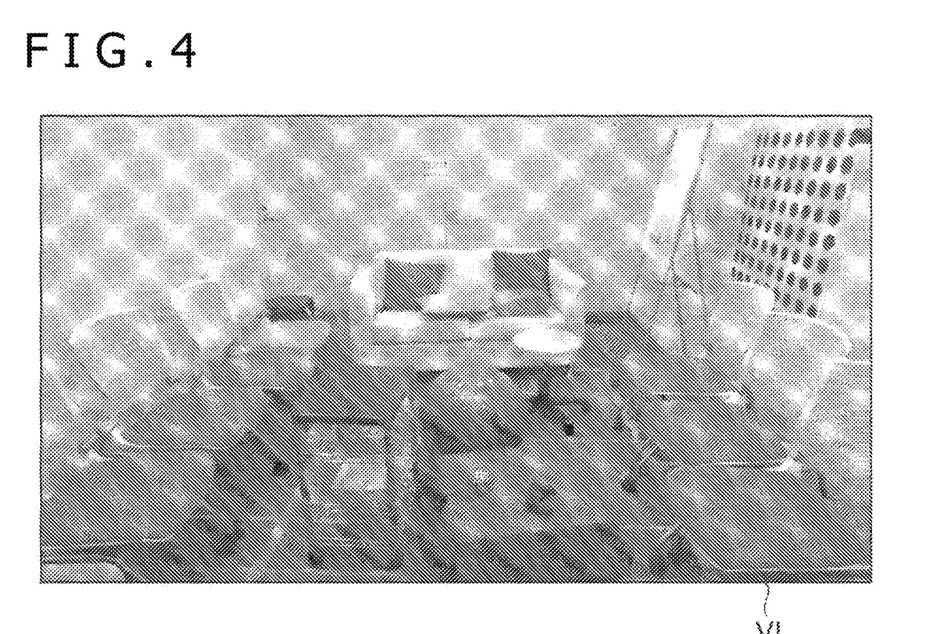
FIG. 4 is a diagram illustrating an example of a scene image representing a scene in a real space.
Figure 5:
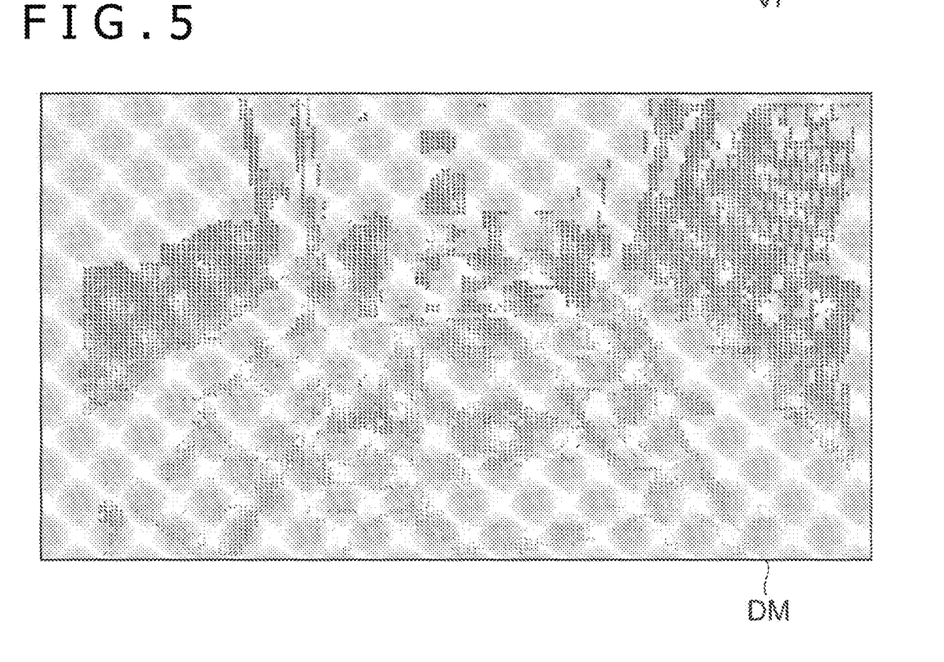
FIG. 5 is a diagram illustrating an example of a depth map corresponding to the scene image illustrated in FIG. 4.

FIG. 4 illustrates an example of the scene image VI that represents a scene in the real space photographed by one of the cameras constituting the stereoscopic camera 15. Further, FIG. 5 illustrates an example of the depth map DM corresponding to the scene image VI. In an example of the figure, the distance D cannot be specified in all the unit areas in the depth map DM. Specifically, a dot pattern in the figure represents the unit area in which the distance D up to a subject portion that appears in the position is specified. By contrast, an area in which the dot pattern is not arranged is an area in which the distance D cannot be specified. In a location in which a correspondence relationship cannot be specified between two photographic images obtained by the stereoscopic camera 15, the distance D is not calculated. The detection point P corresponds one-on-one to the unit area in which the distance D is specified in the depth map DM. That is, when an object having a certain size appears across the plurality of unit areas in the depth map DM, a plurality of detection points P exist on a surface of the object.

The space coordinate calculation section 22 calculates position coordinates (space coordinates) X in the real space of each detection point P on the basis of information regarding the position and distance D in an image of each unit area included in the depth map DM described above. Specifically, the position coordinates in the depth map DM in the unit area to be noticed here are assumed to be represented by (u, v). The coordinate value represents a direction up to the detection point P based on a position of the stereoscopic camera 15. By using information regarding the coordinate value (u, v) and the distance D, a value of the position coordinates X of the detection point P can be calculated in a space coordinate system in which a position of the stereoscopic camera 15 is defined as an origin. Note that the color component C of each unit area represents a color of the subject portion in a position of the detection point P. That is, information regarding the position coordinates X and the color component C is obtained in each of the plurality of detection points P in the real space.

As an example, the distance D and the color component C are assumed to be specified in N pieces of unit areas in the depth map DM. Here, using i as an integral number from one to N, position coordinates within the depth map DM in an i-th unit area are written as $(u_i, v_i)$ and a distance up to the subject that appears in the unit area is written as $D_i$. In addition, color components in the unit area are assumed to be represented by three luminance values of $C_{ri}$, $C_{gi}$, and $C_{bi}$. At this time, position coordinates $X_i$ of a detection point Pi corresponding to the i-th unit area are calculated from three values of ui, vi, and Di. The position coordinates Xi are represented by coordinate values (xi, yi, zi) in a three-dimensional space. Further, the color components C of the detection point Pi are represented by three luminance values (Cri, Cgi, Cbi). As described above, the coordinate values (xi, yi, zi) of the position coordinates X and the luminance values (Cri, Cgi, Cbi) of the color component C are specified in each of N pieces of detection points P.

Figure 6:
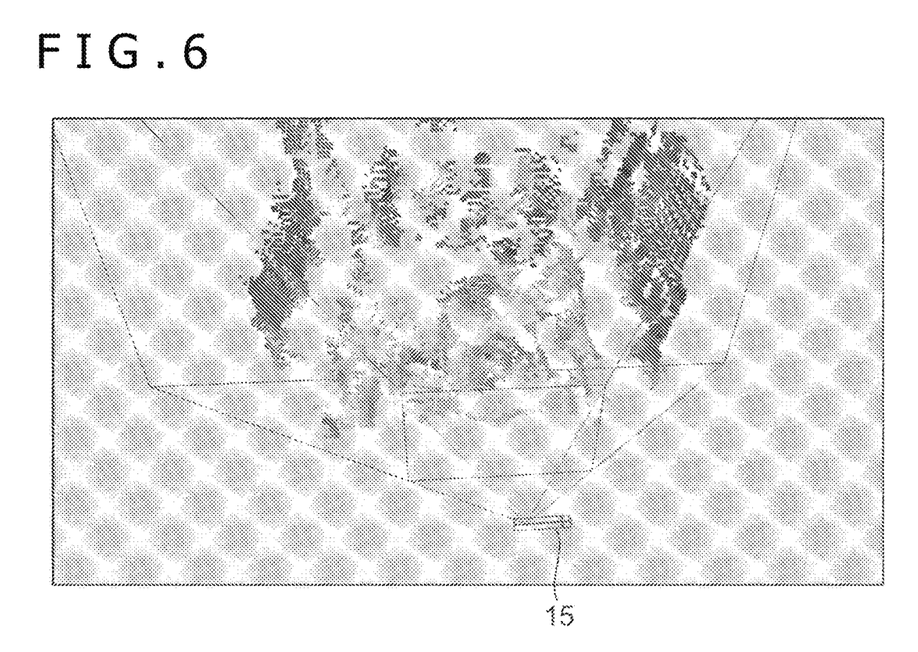
FIG. 6 is a diagram illustrating a state of plotting within a virtual space a detection point in which a distance is detected in the depth map.

FIG. 6 illustrates a state in which the plurality of detection points P are plotted in the virtual space corresponding to the real space. A position of each detection point P in the figure corresponds to a position in the real space represented by the position coordinates X. Further, a straight line extended from a photographing position of the stereoscopic camera 15 in the figure indicates the photographing range of the stereoscopic camera 15. As described above, by using the depth map DM, a position and color of an object that exists in the photographing range of the stereoscopic camera 15 are specified.

The object display color determination section 23 arranges the virtual object O in the virtual space corresponding to the real space. Note that information regarding a shape, texture of a surface in the virtual object O, and the like are assumed to be previously stored in the storage section 12.

Further, the object display color determination section 23 determines a display color of the virtual object O on the basis of the information regarding the position coordinates X of each detection point P calculated by the space coordinate calculation section 22 and the color component C. More specifically, the object display color determination section 23 reflects an influence (lighting effect) caused by surrounding light on an original color on a surface of the virtual object O and thereby determines a color component on the surface of the virtual object O when displaying the virtual object O really. When determining the lighting effect, the information regarding the position coordinates X of each detection point P and regarding the color component C is used as a light source. This is a method similar to a known method using an image as the light source, which is referred to as image-based lighting. Note, however, that in the image-based lighting, a previously prepared image is used as the light source, and therefore it is difficult to reflect a time change in the real space on the virtual object O in real time. Further, in the image-based lighting, the light source is assumed to exist in a position sufficiently distant from the virtual object O. Therefore, a change in an influence of the light source caused by a change in a position of the virtual object O cannot be reproduced and the lighting effect on the virtual object O becomes the same regardless of an arrangement position of the virtual object O. By contrast, in the present embodiment, the depth map DM is really acquired by using the stereoscopic camera 15 to thereby use, as the light source, the information regarding the position coordinates X of each detection position P calculated on the basis of the depth map DM and regarding the color component C. For that purpose, an influence on the virtual object O caused by surrounding light can be reproduced in a shape nearer to actuality as compared to the image-based lighting.

Hereinafter, a specific example of processing in which the object display color determination section 23 determines the display color of the virtual object O by using information regarding the detection point P will be described. First, the object display color determination section 23 converts the position coordinates X of each detection point P into a coordinate value of a polar coordinate system (spherical coordinate system) in which an arrangement position of the virtual object O is defined as the origin. The coordinate value of the polar coordinate system includes two angular values (θ, φ) that represent a direction of each detection point P viewed from the virtual object O and a distance r from the origin up to the detection point P. Here, θ takes a value from zero degree up to 360 degrees representing a direction of the detection point P viewed from the virtual object O. Further, φ represents an elevation angle or depression angle of the detection point P viewed from the virtual object O and takes a value from −90 degrees (a directly downward direction) up to +90 degrees (a directly upward direction) with a horizontal direction defined as zero degree.

Figure 7:
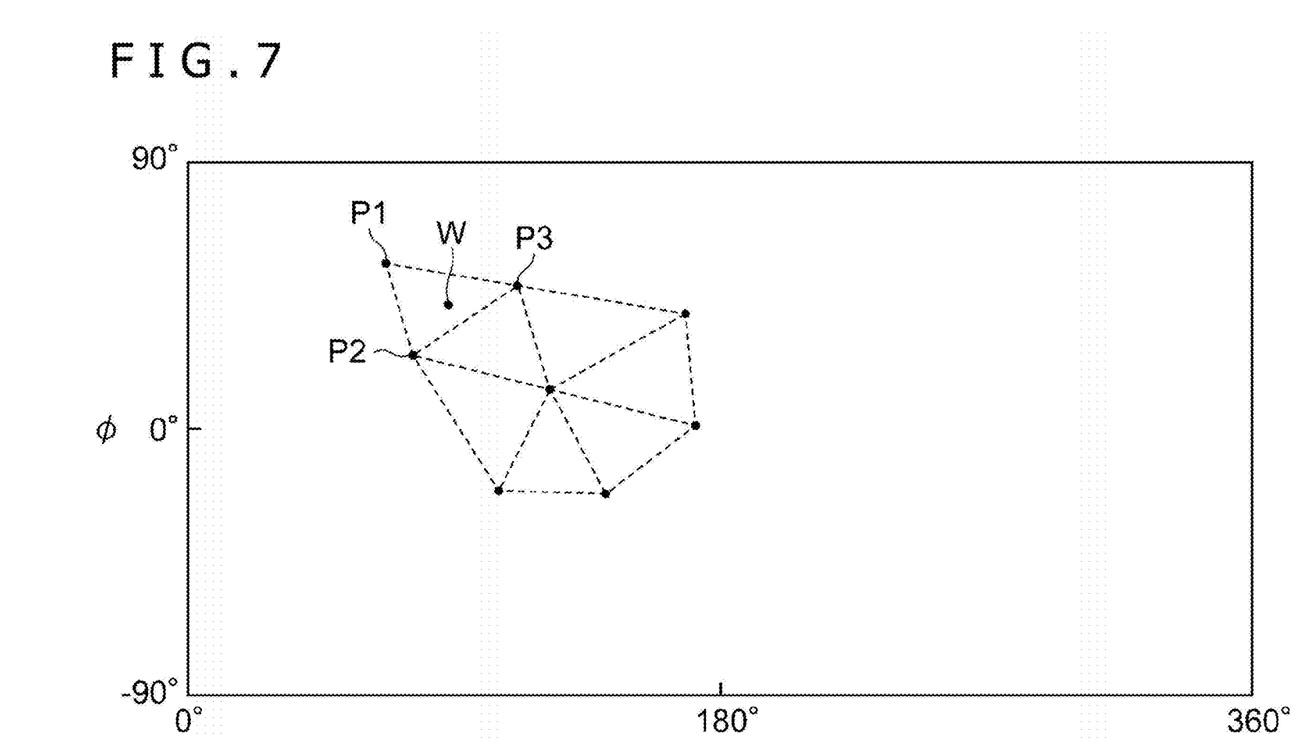
FIG. 7 is a diagram illustrating an example of a light source image of the present embodiment.

FIG. 7 illustrates a state in which a portion of detection points P are arranged in a (θ, φ) plane of the polar coordinate system and illustrates positions of the plurality of detection points P including three points of the detection points P1 to P3 as a sample. As described above, a plane image in which the detection point P is arranged in the (θ, φ) plane is used to determine the lighting effect on the virtual object O similarly to a light source image in the image-based lighting. Hereinafter, the plane image obtained by arranging the detection point P in the (θ, φ) plane is referred to as a light source image LM. The light source image LM is an image in which the information regarding the color component C and the distance r is set to each of the plurality of unit areas obtained by dividing an interior portion. The color component C and the distance r corresponding to the detection point P are set to the unit area corresponding to the detection point P. The color component C represents a color of an object that exists in the detection point P and the distance r represents a distance from the virtual object O up to the detection point P. Note that, the color component C of the detection point P may be the color component C itself of the unit area corresponding to the detection point P in the depth map DM or may be an average etc. of the color components C of the detection point P and the surrounding detection points P.

In the light source image LM, the detection point P does not correspond to all the unit areas and therefore the unit area to which the detection point P does not correspond also exists. For example, in a location, which is a dead angle, hidden under the shadow of other objects viewed from the stereoscopic camera 15, the fact that any object exists there cannot be specified by using the depth map DM. Therefore, even if some sort of object exists in such a dead angle, the detection point P representing the object is not included in the light source image LM. Further, as described above, it is not limited that the distance D can be specified in all the unit areas within the depth map DM. Therefore, in a subject that appears in the unit area in which the distance D cannot be specified, the detection point P corresponding to the subject cannot be arranged in the light source image LM. Further, information regarding an object that exists outside the photographing range of the stereoscopic camera 15 is not originally reflected on the light source image LM. In accordance with such a reason, the unit area (hereinafter, referred to as a blank area) to which the detection point P does not correspond exists in the light source image LM. When the lighting effect is determined, the blank area may be neglected. Further, interpolation processing is performed by using information regarding the known detection point P and thereby the color component C and distance r in the blank area may be determined. A specific example of the interpolation processing will be described below.

After the interpolation processing is performed if necessary, the object display color determination section 23 determines the display color of the virtual object O at the time when light from the light source is irradiated, by using, as the light source, each unit area (the unit area corresponding to the detection point P and the unit area in which the color component C is calculated by the interpolation processing) in which the color component C is set in the light source image LM. This can be implemented by using processing similar to the image-based lighting. Note, however, that in the present embodiment, not only the color component C but also the distance r from the virtual object O is set to each unit area in the light source image LM. For that purpose, when the display color of the virtual object O is determined, as the distance r is smaller in the unit area (that is, the unit area in which an object is assumed to exist in a position near to the virtual object O), the lighting effect is more strengthened on the virtual object O caused by the unit area. Specifically, for example, a luminance value included in the color component C is corrected so that luminance becomes larger than an actual one in the unit area in which the distance r is small. By contrast, the luminance value is corrected so that the luminance becomes smaller than an actual one in the unit area in which the distance r is large. Further, after each unit area is corrected by using a calculating formula similar to that of the image-based lighting, a color indicated by the color component C is projected on the surface of the virtual object O. Thereby, the realistic lighting effect on which a position relationship between a real position of each detection point P and the virtual object O is reflected can be implemented. Note that, when calculating the lighting effect on the virtual object O caused by the light source image LM, there may be used not only the distance r but also setting regarding a surface material (the virtual object O is made of a substance that easily reflects surrounding light, a substance that hardly reflects surrounding light, or the like) of the virtual object O, information regarding an incidence angle of light from the unit area to the surface of the virtual object O, and the like.

Further, the object display color determination section 23 may calculate a change in a color of surrounding objects caused by arranging the virtual object O. Specifically, the object display color determination section 23 carries out an operation of the lighting effect similar to that of the virtual object O described above to each detection point P around a position in which the virtual object O is arranged in the virtual space and calculates the variation of a color caused by light from the virtual object O. Note, however, that an influence of light caused in other detection points P ought to be reflected on the scene image VI in which the real space is really photographed. Therefore, the object display color determination section 23 just has to calculate only an influence on the detection point P caused by the color component on the surface of the virtual object O. Further, it is not necessary to reflect an influence of light from the virtual object O on all the detection points P. For example, the object display color determination section 23 calculates the variation of a color caused by the virtual object O only in the detection point P in which a distance from the virtual object O is equal to or smaller than a predetermined value. A specific example of calculations of the lighting effect caused by the virtual object O will be described below.

The composite image generation section 24 generates the composite image CI in which the virtual object O is arranged in the scene image VI. Here, the virtual object O that is arranged while superposed on the scene image VI has a shape viewed from a position in the virtual space corresponding to the stereoscopic camera 15 and is displayed with a display color determined by the object display color determination section 23.

In addition, the composite image generation section 24 allows a change in a color to be caused by an influence of the virtual object O in the surrounding areas of the virtual object O in the scene image VI. Specifically, the composite image generation section 24 allows the variation of a color caused by light from the virtual object O in each detection point P calculated by the processing described above to be reflected on a pixel corresponding to the detection point P in the scene image VI. Further, the composite image generation section 24 may change a pixel value similarly to not only the pixel corresponding to the detection point P but also the surrounding pixels. Thereby, when the virtual object O really exists, the lighting effect that is assumed to be caused by the light can be made to be reflected on the scene image VI.

Figure 8:
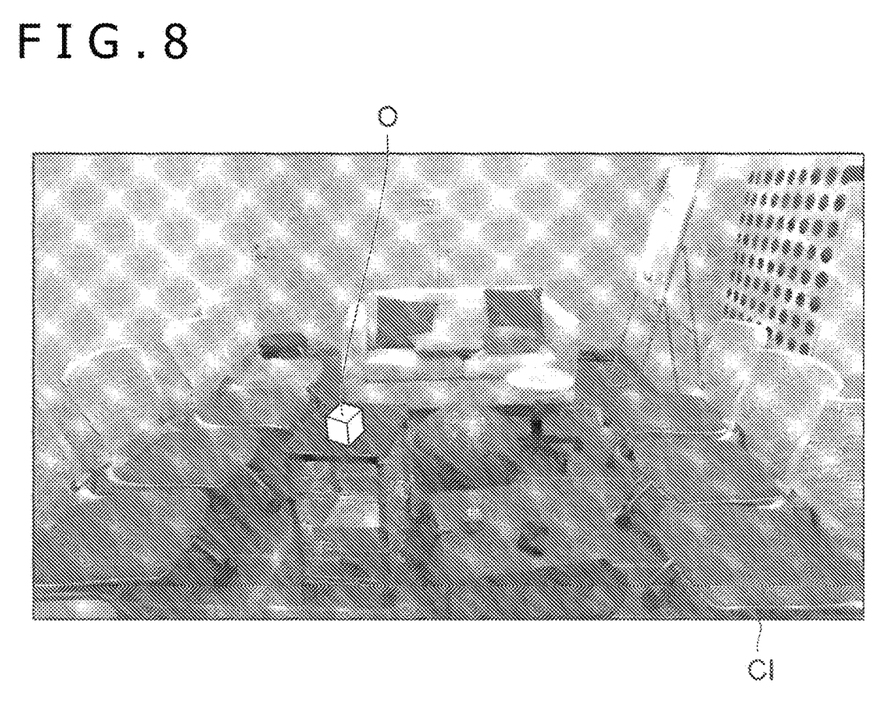
FIG. 8 is a diagram illustrating an example of a composite image in which a virtual object is arranged.

FIG. 8 is a diagram illustrating an example of the composite image CI and illustrates a state in which the virtual object O is arranged in the scene image VI illustrated in FIG. 4. The generated composite image CI as described above is displayed on a screen of the display apparatus 14. Thereby, there can be displayed a state in which the lighting effect caused by a real surrounding scene is reflected on the scene image VI and the virtual object O exists in which coloring is changed.

Hereinafter, a specific example of the interpolation processing in which the object display color determination section 23 determines the color component C and distance r of the blank area in the light source image LM will be described.

First, as a first example, an example in which interpolation is used will be described. In the example, the plurality of detection points P are tied in the light source image LM and the light source image LM is divided into a plurality of meshes (polygon area). Then, in a certain blank area in each mesh, a value obtained by weight averaging the color component C of the detection point P to constitute vertexes of the mesh is used as the color component C of the blank area. At this time, a weight multiplied by the color component C of each detection point P may be determined in accordance with a distance between the blank area and each detection point P. In FIG. 7, for example, in the blank area W surrounded by the detection points P1, P2, and P3, a luminance value Crw of a red color is calculated by using the following calculating formula.

$$Crw=(w1 \cdot Crp1+w2 \cdot Crp2+w3 \cdot Crp3)/(w1+w2+w3)$$

Here, Crp1, Crp2, and Crp3 are luminance values of the red color of the detection points P1, P2, and P3, respectively. Further, w1, w2, and w3 are weights determined in accordance with the distance between each detection point P and each blank area W. As the distance between the detection point P and the blank area W is smaller, the weight is determined to become larger. Also, the luminance values of the other key colors are similarly calculated. Also, the distances r may be similarly calculated.

Note that a calculation of the color component C in the blank area by such interpolation can be implemented by using a GPU (Graphics Processing Unit) in view of hardware. The GPU includes a function in which when texture mapping etc. are performed, the color component of a texel surrounded by a plurality of vertexes is calculated from the color component of vertexes in the surrounding by using the interpolation. By using such a function, the object display color determination section 23 can calculate the color component C of each blank area at high speed.

As a second example of the interpolation processing, the object display color determination section 23 may set the same color component C to all the blank areas surrounded by the plurality of detection points P. In this case, the color component C set to the blank area may be a typical value (average etc.) of the color components C of the plurality of detection points P surrounding the blank area. In this example, for example, the same color component C is set to all the blank areas in a triangular shape formed by tying the detection points P1, P2, and P3 illustrated in FIG. 7. Note that the same value calculated similarly may be set also to the distance r.

Next, a specific example of calculations of the lighting effect on surrounding objects caused by the virtual object O will be described.

First, the object display color determination section 23 calculates distances from the noticeable detection point P up to one or a plurality of reference points on the surface of the virtual object O with regard to the noticeable detection point P as a target to calculate an influence caused by the virtual object O. Here, the reference point set to the surface of the virtual object O may be a texel of the texture mapped on the surface of the virtual object O or an area composed of a plurality of texels. In addition, the reference point may be a vertex of a polygon composing the virtual object O.

Continuously, the object display color determination section 23 calculates the variation (lighting effect) of a color of the noticeable detection point P caused by light from the reference point by using information regarding the color component of each reference point on the surface of the virtual object O. As a specific example, a variation $\Delta Cp1$ of a color of a certain noticeable detection point P1 caused by an influence of one reference point O1 on the surface of the virtual object O may be calculated by using the following calculating formula.

$$\Delta Cp1 = (A \cdot Co1)/r$$

Here, Co1 is a value of the color component of the reference point O1 and r is a distance between the reference point O1 and the noticeable detection point P1. Further, A is a predetermined constant. Note that when the color component is composed of plural types of values (luminance values etc. of a plurality of key colors), the variation is calculated by using the above-described calculating formula in respective cases. Alternatively, the variation $\Delta Cp1$ may be calculated by using the following calculating formula.

$$\Delta Cp1 = A \cdot Co1 \cdot \exp(-r)$$

In the case of using the calculating formula, when the distance r becomes large, an influence of a color of the virtual object O becomes exponentially small. Desirably, even if any calculating formula is used, as the distance r is larger, an influence of the color of the virtual object O becomes smaller.

When the plurality of reference points exert an influence on one noticeable detection point P, the object display color determination section 23 calculates the variation of each reference point by using the calculating formula as described above. Then, the object display color determination section 23 totalizes the calculated variation of each reference point and calculates a total variation. The total variation is the variation $\Delta Cp$ of a color caused by an influence of the virtual object O against the color component C of the noticeable detection point P.

The object display color determination section 23 calculates the variation $\Delta Cp$ of the color by the calculation as described above and adds the variation $\Delta Cp$ of the color to the color component C of the original noticeable detection point P with regard to each of the plurality of noticeable detection points P around the virtual object O. Thereby, it is possible to represent the lighting effect on areas around the virtual object O in the composite image CI. In order to calculate the lighting effect on the surrounding objects caused by the virtual object O, the color component obtained by reflecting the lighting effect caused by the light source image LM described above is desirably used as the color component of each reference point.

Since the distance r up to the virtual object O is used in the calculating formula described above, the variation $\Delta Cp$ of the color can be calculated only in the detection point P capable of specifying the position coordinates X in the real space. The variation $\Delta Cp$ may be determined by using the interpolation processing in colors of positions other than the detection points P in the composite image CI. The interpolation processing in this case may be processing similar to that performed in the blank area within the light source image LM. Specifically, the object display color determination section 23 calculates the variation $\Delta Cp$ of the color in the noticeable area by a weighted average etc. by using the variation $\Delta Cp$ of the colors of the plurality of detection points P around the noticeable area against the noticeable area as the target of the interpolation processing. Alternatively, the object display color determination section 23 may directly use the variation $\Delta Cp$ of the color of the detection point P nearest to the noticeable area as a value of the variation $\Delta Cp$ of the color of the noticeable area.

Further, as a method different from that described above, the object display color determination section 23 may specify, on the basis of the depth map DM, a position of a light source that exists in the real space. Then, the object display color determination section 23 may calculate the lighting effect on a circumference caused by the virtual object O by using the specified light source position. In the example, the position coordinates of the light source position in the real space are calculated by using the depth map DM. For example, the object display color determination section 23 determines the detection point P in which a value of the color component C is larger than a predetermined value in the depth map DM (i.e., luminance or lightness is high) to be the light source. Note that when the detection point P in which a value of the color component C is larger than a predetermined value exists in plurality in a range with a predetermined size, it may be determined that the light source exists in a center location of the detection points P. Nevertheless, by using information regarding the distance D included in the depth map DM, the object display color determination section 23 can specify a three-dimensional position coordinates Lx of the light source in the real space.

When specifying the position coordinates Lx of the light source, by reflecting light from the light source on the surface of the virtual object O, the object display color determination section 23 calculates the variation $\Delta Cp$ of the color caused in another detection point P. The lighting effect caused by the reflection of light from the above light source can be calculated by a known method by using information regarding the color component C of the light source, the position coordinates Lx of the light source, a normal direction on the surface of the virtual object O, and the like. Even the lighting effect caused in locations other than the detection point P can be further calculated by the interpolation processing similar to the example described above.

Further, the object display color determination section 23 may represent a shadow of the virtual object O caused by light from the light source by using the position coordinates Lx of the light source and those of the virtual object O. Specifically, assuming that the three-dimensional position coordinates of the noticeable detection point P1 around the virtual object O is X1, the object display color determination section 23 determines whether or not a straight line tying the position coordinates X1 and the position coordinates Lx of the light source passes through the virtual object O. Then, if it is determined that the straight line passes through the virtual object O, the shadow of the virtual object O is generated in the noticeable detection point P1, and therefore the object display color determination section 23 performs a correction for making dark a color of the noticeable detection point P1. Similarly to a calculation example of the lighting effect described above, determination results of the surrounding detection points P are used and the interpolation processing is performed in an area in which the distance D is not specified. This process permits the shadow generated in the composite image CI to be represented by the existence of the virtual object O.

By using a method as illustrated above, the object display color determination section 23 generates a reflection/shade map texture including information regarding the lighting effect (variation of the color) caused by the virtual object O against each unit area included in the scene image VI. The composite image generation section 24 superimposes the texture on the scene image VI to thereby generate the composite image CI on which the lighting effect caused by reflecting and blocking light from the light source existing in the real space by the virtual object O is reflected.

Figure 9:
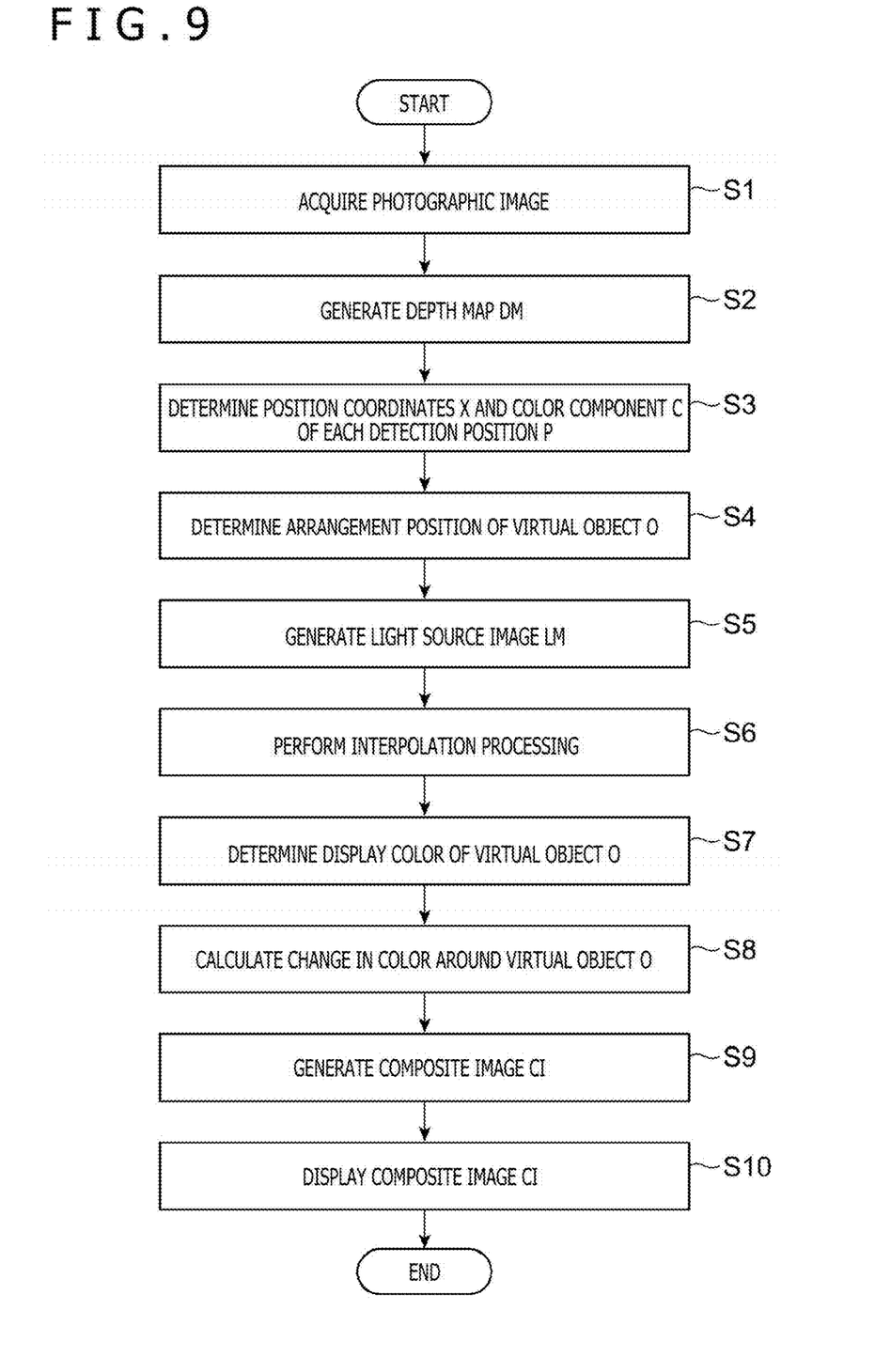
FIG. 9 is a flow diagram illustrating an example of a flow of processing performed by the image processing apparatus according to the embodiment of the present invention.

Here, a specific example of a flow of processing performed by the image processing apparatus 1 will be described with reference to a flow diagram illustrated in FIG. 9.

First, the image acquisition section 21 acquires two sheets of photographic images photographed by the stereoscopic camera 15 (step S1). Here, the photographic image photographed by the camera 15a is assumed to be used as the scene image VI. Continuously, the image acquisition section 21 generates the depth map DM by using the two sheets of photographic images acquired in step S1 (step S2).

Next, the space coordinate calculation section 22 determines the position coordinates X and color component C of the detection point P by using information regarding each unit area in the depth map DM generated in step S2 (step S3). Here, with regard to the same number of the detection points P as that of the unit areas in which the distance D is specified in the depth map DM, the position coordinates X are calculated.

Next, the object display color determination section 23 determines an arrangement position in the real space of the virtual object O (step S4). The object display color determination section 23 may determine the arrangement position of the virtual object O, for example, in accordance with an instruction of a user. Alternatively, the object display color determination section 23 may determine the arrangement position of the virtual object O on the basis of results obtained by analyzing the scene image VI.

Further, the object display color determination section 23 converts the position coordinates X of each detection point P calculated in step S3 into a coordinate value in the polar coordinate system in which an arrangement position of the virtual object O determined in step S4 is defined as the origin. This process permits the light source image LM to be generated (step S5). Then, the object display color determination section 23 performs the interpolation processing against the blank area in the light source image LM by using information regarding the position, distance r, and color component C in the light source image LM of the detection point P calculated in step S5 (step S6).

Next, the object display color determination section 23 determines the display color of the virtual object O by using the light source image LM in which the distance r and the color component C are determined against each unit area in steps S5 and S6 (step S7). Further, the object display color determination section 23 calculates a change in a color that is assumed to be caused by an influence of the virtual object O in the detection points P around the virtual object O by using information regarding the display color of the virtual object O determined in step S7 (step S8).

Next, the composite image generation section 24 combines the virtual object O with the scene image VI obtained in step S1 to generate the composite image CI (step S9). At this time, the composite image generation section 24 uses the color determined in step S7 as the display color of the virtual object O. Further, a change in the color determined in step S8 is reflected on pixels around the virtual object O in the scene image VI. Thereby, the composite image generation section 24 can generate the composite image CI in which the lighting effect is reflected on the virtual object O or objects around the virtual object O as if the virtual object O really exists. The composite image generation section 24 allows the generated composite image CI to be displayed on the screen of the display apparatus 14 (step S10).

The image processing apparatus 1 repeatedly performs the processing described above, for example, at a time interval according to a frame rate of the display apparatus 14. Thereby, the image processing apparatus 1 can display a moving image in which surrounding conditions are reflected on the display color of the virtual object O in real time, such as the display color of the virtual object O is darkened when hidden in the shadow of a person.

Meanwhile, the embodiment of the present invention is not limited to the embodiment as described above. In the above description, for example, the photographic image used to generate the depth map DM is directly used as the scene image VI. However, not being limited thereto, the image processing apparatus 1 may acquire the scene image VI separate from the photographic image used to generate the depth map DM. For example, the image processing apparatus 1 uses an image photographed under predetermined photography conditions as the scene image VI. By contrast, the depth map DM is generated when using an image photographed under photography conditions different from those at the time of photographing the scene image VI. The photography conditions in this case include a shutter speed, an exposure, a sensitivity, and the like. By changing the photography conditions as described above, the photographing can be performed under conditions in which the distance D is easy to specify. Note that, in this case, information regarding the color component C in each unit area included in the depth map DM may be determined with reference to the scene image VI. Further, when photographing the photographic image used to generate the depth map DM, the shutter speed is quickened to thereby obtain the depth map DM in which the distance D is specified only in a bright unit area. When using the depth map DM as described above, the display color of the virtual object O can be determined while neglecting the detection point P with low luminance in which it is assumed that an influence of the lighting effect is small on the virtual object O, and further using only the detection point P with high luminance in which it is assumed that an influence of the lighting effect is large on the virtual object O. Note that in place of changing the photography conditions of the stereoscopic camera 15, calculation of the lighting effect may be performed by using information regarding the unit area in which a value of the color component C in the depth map DM is equal to or larger than a predetermined value.

Further, in the above description, the lighting effect on the virtual object O is determined by using only a sheet of depth map DM obtained by the photographing by one stereoscopic camera 15. Although not being limited thereto, the display color of the virtual object O may be determined by using a plurality of depth maps DM obtained by a plurality of stereoscopic cameras 15 that are arranged in positions different from each other. In this example, the image processing apparatus 1 is assumed to previously acquire information regarding a position relationship between respective stereoscopic cameras 15. The space coordinate calculation section 22 calculates the position coordinates X of the detection point P by using the depth maps DM obtained by the photographing of the respective stereoscopic cameras 15. Then, the object display color determination section 23 arranges the plurality of detection points P obtained from the plurality of depth maps DM in one light source image LM and generates the light source image LM. At this time, when the detection points P obtained from the respective stereoscopic cameras 15 are present in a range of a predetermined distance in the real space, only a single data set may be used or both data sets may be reflected on the light source image LM. The display color of the virtual object O is determined by using the light source image LM obtained as described above. Thereby, even information regarding an area etc. of the dead angle that cannot be photographed by only one depth map DM can be reflected on the display color of the virtual object O. For example, the stereoscopic cameras 15 are installed in both a low position and a high position of a ceiling etc. and the depth map DM is generated by using the photographic images obtained from the stereoscopic cameras 15. Thereby, the display color of the virtual object O can be determined by using the information regarding the detection point P that cannot be specified by only a single depth map DM.

Further, the image processing apparatus 1 may determine the display color of the virtual object O by using the plurality of depth maps DM obtained by performing a plurality of times of photographing by the same stereoscopic camera 15 with a time interval. Particularly, by performing the plurality of times of photographing while changing the photography conditions, photographing direction, and photographing position of the stereoscopic camera 15, information regarding the detection position P can be more acquired. Particularly, when the display apparatus 14 is a head-mounted display and the stereoscopic camera 15 is mounted on the head-mounted display, the photographing range of the stereoscopic camera 15 is varied in accordance with a movement of the user's face. BY using the plurality of depth maps DM obtained by performing the photographing before and after the change, the display color of the virtual object O can be determined by using the information regarding the detection point P in a wide range.

Further, a camera that photographs the scene image VI may be a camera different from the stereoscopic camera 15 that photographs the depth map DM. In this case, the image processing apparatus 1 is assumed to previously acquire information regarding a position relationship between respective cameras in the same manner as in a case in which the plurality of stereoscopic cameras 15 are used. When there is proved a position relationship between a position in the real space of each detection point P obtained from the depth map DM and the photographing range of the scene image VI, the image processing apparatus 1 can determine the display color of the virtual object O that is arranged while superimposed on the scene image VI by using the information regarding the detection point P.

In the above description, the depth map DM is assumed to be generated by using a plurality of photographic images obtained by the stereoscopic camera 15. However, not being limited thereto, when the depth map DM includes information regarding the distance D up to the subject in each unit area of the interior portion, the depth map DM may be generated by any scheme. Specifically, the image processing apparatus 1 may determine the display color of the virtual object O, for example, by using the depth map DM generated by a pattern irradiation method, a TOF method, or the like.

Further, in the above description, the image processing apparatus 1 is installed in a location in which the photographing of the scene image VI or the depth map DM is performed and is connected directly to the stereoscopic camera 15. However, the embodiment of the present invention is not limited thereto. For example, the image processing apparatus 1 may be a server apparatus or the like that is installed in a location distant from a photographing place. In this case, the image processing apparatus 1 does not generate the depth map DM by itself but may receive and acquire the depth map DM generated by another computer through a network.

REFERENCE SIGNS LIST

1 Image processing apparatus, 11 Control section, 12 Storage section, 13 Interface section, 14 Display apparatus, 15 Stereoscopic camera, 21 Image acquisition section, 22 Space coordinate calculation section, 23 Object display color determination section, 24 Composite image generation section

The invention claimed is:
1. An image processing apparatus comprising:
a depth map acquisition section configured to acquire a depth map that includes information that indicates a distance up to a subject in an actual space, the depth map including, for each of one or a plurality of areas in the depth map, information regarding the distance up to a subject portion that appears in the area and regarding a color component of the subject portion; and
a composite image generation section configured to generate a composite image in which a virtual object is arranged in a scene image that represents a scene of the actual space, wherein
the composite image generation section determines a display color of the virtual object on a basis of the distance up to the subject portion that appears in the depth map and the color component thereof; and wherein
a plurality of images, of the actual space, each obtained under respective conditions different than conditions under which the scene image is obtained, are used to generate the depth map, such different conditions being conditions in which the distance up to the subject portion that appears in the depth map is more easily indicated than in the conditions under which the scene image is obtained;
the plurality of images are obtained using a stereoscopic camera; and the respective conditions differ from one another, and from the conditions under which the scene image is obtained, with regard to photographing direction, photographing position, and photographing range of the camera.

2. The image processing apparatus according to claim 1, wherein the composite image generation section calculates an influence, on the virtual object, caused by light from the subject portion on the basis of a position in the actual space of the subject portion and the color component of the subject portion, and determines the display color of the virtual object.

3. The image processing apparatus according to claim 2, wherein the composite image generation section calculates a position coordinate of the subject portion in a polar coordinate system in which an arrangement position of the virtual object is defined as an origin, generates a light source image in which the color component of the subject portion is associated with a unit area corresponding to the calculated position coordinate, and determines the display color of the virtual object by using the light source image.

4. The image processing apparatus according to claim 3, wherein a plurality of unit areas corresponds to the subject portion, the color component of the subject portion is associated with the plurality of unit areas, and the composite image generation section performs interpolation processing associating the color component calculated in accordance with the color component of the subject portion, which surrounds the unit area, with the unit area that does not correspond to the subject portion in the light source image, and then determines the display color of the virtual object by using the light source image.

5. The image processing apparatus according to claim 4, wherein the composite image generation section associates the color component calculated by a weighted average of the color component of the subject portion, with the unit area that does not correspond to the subject portion in the interpolation processing.

6. The image processing apparatus according to claim 1, wherein
the depth map acquisition section acquires a plurality of depth maps that include information regarding the distance based on the position in the actual space, and
the composite image generation section determines the display color of the virtual object on the basis of information regarding one or a plurality of subject portions that appear in each of the plurality of depth maps.

7. The image processing apparatus according to claim 1, wherein the composite image generation section calculates a variation of a color of the subject portion caused by the light from the virtual object on the basis of the position in the actual space of the subject portion and the display color of the virtual object and changes a color of a pixel in the scene image corresponding to the subject portion in accordance with the calculated variation.

8. The image processing apparatus according to claim 7, wherein the composite image generation section determines the display color of the virtual object on the basis of the distance up to the subject portion that appears in the depth map and the color component thereof and then calculates the variation of the color of the subject portion on the basis of the determined display color.

9. The image processing apparatus according to claim 1, wherein
the image processing apparatus is connected to a display apparatus that is worn on a head and is used by a user, the depth map acquisition section acquires the depth map generated on the basis of a photographic image photographed by a stereoscopic camera mounted on the display apparatus, and
the composite image generated by the composite image generation section is displayed on the display apparatus.

10. The image processing apparatus of claim 1, wherein the plurality of images are obtained using a single stereoscopic camera.

11. An image processing apparatus comprising:
a depth map acquisition section configured to acquire a depth map that includes information that indicates a distance up to a subject in an actual space, the depth map including, for each of one or a plurality of areas in the depth map, information regarding the distance up to a subject portion that appears in the area; and
a composite image generation section configured to generate a composite image in which a virtual object is arranged in a scene image that represents a scene of the actual space, wherein
the composite image generation section calculates a variation of a color of the subject portion caused by light from the virtual object on a basis of a position in the actual space of the subject portion and a display color of the virtual object and changes a color of a pixel in the scene image corresponding to the subject portion in accordance with the calculated variation; and wherein
a plurality of images, of the actual space, each obtained under respective conditions different than conditions under which the scene image is obtained, are used to generate the depth map, such different conditions being conditions in which the distance up to the subject portion that appears in the depth map is more easily indicated than in the conditions under which the scene image is obtained;
the plurality of images are obtained using a stereoscopic camera; and
the respective conditions differ from one another, and from the conditions under which the scene image is obtained, with regard to photographing direction, photographing position, and photographing range of the camera.

12. An image processing method comprising:
acquiring a depth map that includes information that indicates a distance up to a subject, the depth map including, for each of one or a plurality of areas in the depth map, information regarding the distance up to a subject portion that appears in the area and regarding a color component of the subject portion; and
generating a composite image in which a virtual object is arranged in a scene image that represents a scene of an actual space, wherein
in the composite image generating, a display color of the virtual object is determined on a basis of the distance up to the subject portion that appears in the depth map and the color component thereof; and wherein
a plurality of images, of the actual space, each obtained under respective conditions different than conditions under which the scene image is obtained, are used to generate the depth map, such different conditions being conditions in which the distance up to the subject portion that appears in the depth map is more easily indicated than in the conditions under which the scene image is obtained;
the plurality of images are obtained using a stereoscopic camera; and the respective conditions differ from one another, and from the conditions under which the scene image is obtained, with regard to photographing direction, photographing position, and photographing range of the camera.

13. A non-transitory, computer readable information storage medium in which a computer program is stored, which when the computer program is executed by a computer, causes the computer to carry out actions, comprising:

acquiring a depth map that includes information that indicates a distance up to a subject, the depth map including, for each of one or a plurality of areas in the depth map, information regarding the distance up to a subject portion that appears in the area and regarding a color component of the subject portion; and generating a composite image in which a virtual object is arranged in a scene image that represents a scene of an actual space, wherein in the composite image generating, a display color of the virtual object is determined on a basis of the distance up to the subject portion that appears in the depth map and the color component thereof; and wherein a plurality of images, of the actual space, each obtained under respective conditions different than conditions under which the scene image is obtained, are used to generate the depth map, such different conditions being conditions in which the distance up to the subject portion that appears in the depth map is more easily indicated than in the conditions under which the scene image is obtained;

the plurality of images are obtained using a stereoscopic camera; and the respective conditions differ from one another, and from the conditions under which the scene image is obtained, with regard to photographing direction, photographing position, and photographing range of the camera.

* * * * *